(12) United States Patent
Liang et al.

(10) Patent No.: US 12,124,322 B2
(45) Date of Patent: Oct. 22, 2024

(54) ACCESS OPERATION STATUS SIGNALING FOR MEMORY SYSTEMS

(71) Applicant: Micron Technology, Inc., Boise, ID (US)

(72) Inventors: Qing Liang, Boise, ID (US); Jonathan S. Parry, Boise, ID (US); Giuseppe Cariello, Boise, ID (US); Deping He, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/518,170

(22) Filed: Nov. 3, 2021

(65) Prior Publication Data

US 2022/0129336 A1    Apr. 28, 2022

Related U.S. Application Data

(63) Continuation of application No. 16/891,615, filed on Jun. 3, 2020, now Pat. No. 11,194,643.

(51) Int. Cl.
G06F 11/00 (2006.01)
G06F 11/07 (2006.01)
G06F 11/30 (2006.01)

(52) U.S. Cl.
CPC ........ *G06F 11/073* (2013.01); *G06F 11/0757* (2013.01); *G06F 11/076* (2013.01); *G06F 11/0772* (2013.01); *G06F 11/3037* (2013.01)

(58) Field of Classification Search
CPC ............ G06F 11/0757; G06F 11/0772; G06F 11/073; G06F 11/3037; G06F 11/3055
See application file for complete search history.

(56) References Cited

U.S. PATENT DOCUMENTS 9,588,698 B1    3/2017  Karamcheti et al.
10,194,004 B2 *  1/2019  Gyorffy .............. H04L 67/01
(Continued)

FOREIGN PATENT DOCUMENTS

CN    107015886 A    8/2017
CN    107731258 A    2/2018
(Continued)

OTHER PUBLICATIONS

Chinese patent office, "China Office Action," issued in connection with China Patent Application No. 202110608469.3 dated Mar. 25, 2024 (7 pages).

*Primary Examiner* — Charles Ehne
(74) *Attorney, Agent, or Firm* — Holland & Hart LLP

(57) ABSTRACT

Techniques for access operation status signaling for memory systems are described. In some examples, a memory system may respond to access commands from a host system by performing access operations such as read or write operations. In accordance with examples as disclosed herein, a system may be configured to support access operation status signaling between a host system and a memory system, which may improve the ability of the system to adapt to various access scenarios, including when access operation completion is delayed. For example, when a memory system is performing an error recovery or media management operation, the memory system may indicate that the error recovery or media management operation is being performed or is otherwise ongoing. Such status signaling may indicate that the memory system is actively performing operations, which may be used to inhibit a reset or reinitialization by a host system.

20 Claims, 6 Drawing Sheets

(56) References Cited

U.S. PATENT DOCUMENTS

| | | |
|---|---|---|
| 10,417,091 B2 | 9/2019 | Lesartre |
| 2010/0287446 A1 | 11/2010 | Post et al. |
| 2017/0147209 A1 | 5/2017 | Lee et al. |
| 2017/0168716 A1 | 6/2017 | Shaharabany et al. |
| 2018/0047444 A1 | 2/2018 | Pignatelli et al. |
| 2018/0067696 A1 | 3/2018 | Yun et al. |
| 2018/0095675 A1* | 4/2018 | Kachare ............... G06F 3/0688 |
| 2019/0004896 A1* | 1/2019 | Tokoyoda ............... G06F 12/06 |
| 2019/0265907 A1 | 8/2019 | Yang |
| 2019/0278517 A1 | 9/2019 | Watanabe et al. |
| 2020/0089410 A1 | 3/2020 | Park et al. |
| 2020/0110555 A1 | 4/2020 | Hsiao et al. |
| 2020/0125289 A1 | 4/2020 | Greco et al. |
| 2022/0113887 A1 | 4/2022 | Walker et al. |

FOREIGN PATENT DOCUMENTS

| | | |
|---|---|---|
| CN | 110196823 A | 9/2019 |
| CN | 111198658 A | 5/2020 |

* cited by examiner

ACCESS OPERATION STATUS SIGNALING FOR MEMORY SYSTEMS

CROSS REFERENCE

The present Application for Patent is a continuation of U.S. patent application Ser. No. 16/891,615 by Liang et al., entitled "ACCESS OPERATION STATUS SIGNALING FOR MEMORY SYSTEMS," filed Jun. 3, 2020, which is assigned to the assignee hereof, and expressly incorporated by reference in its entirety herein.

BACKGROUND

The following relates generally to one or more memory systems and more specifically to access operation status signaling for memory systems.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
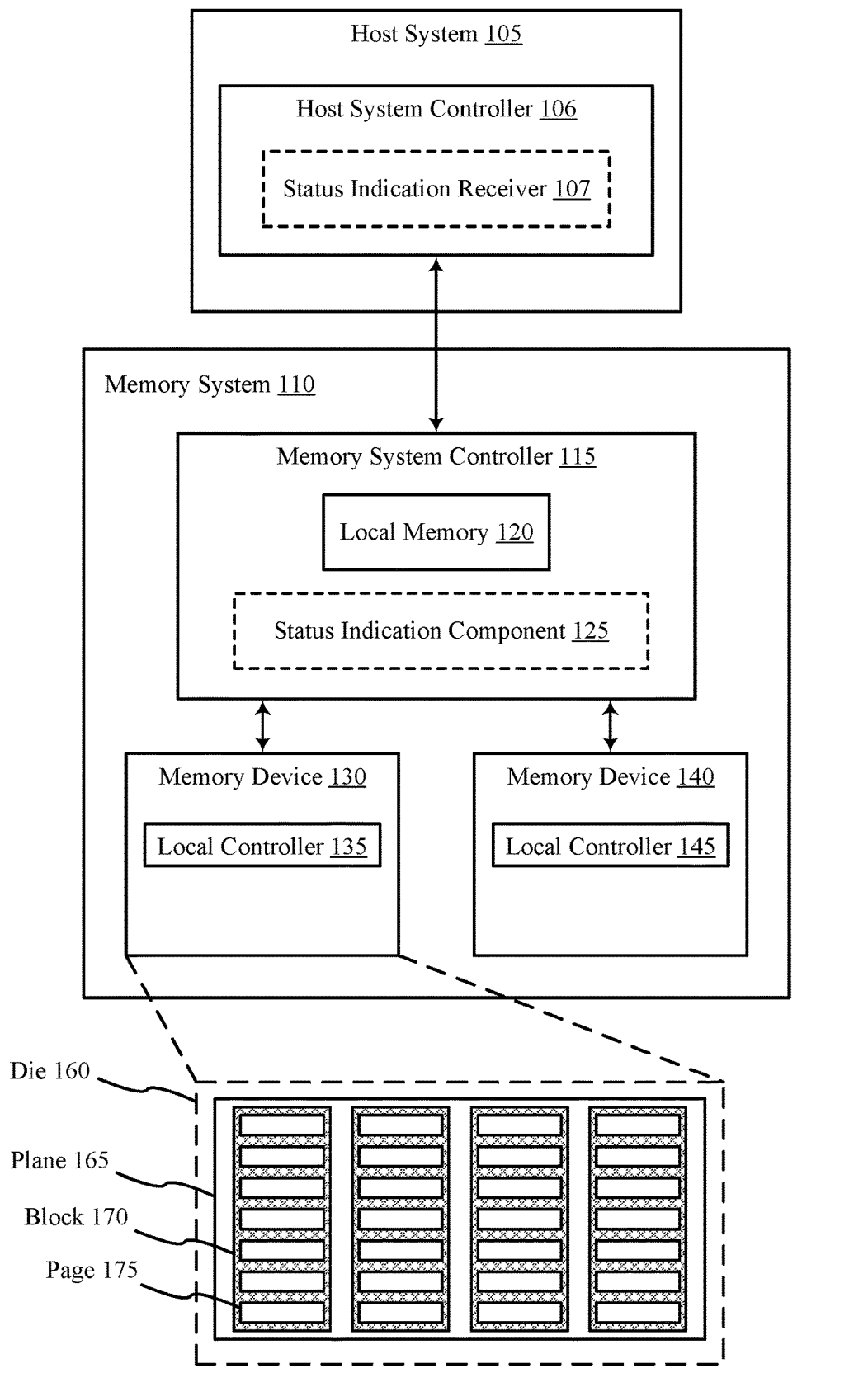
FIG. 1 illustrates an example of a system that supports access operation status signaling for memory systems in accordance with examples as disclosed herein.

A memory system (e.g., one or more memory devices, possibly among one or more other components) may respond to access commands from a host system by performing various access operations on a memory array of the memory system, such as read operations, write operations (e.g., program operations), erase operations, and others. In some cases, a duration for a memory system to perform such operations may be understood, defined, or otherwise predictable. When such a duration is exceeded (e.g., after transmitting an access command, before completion of the access operation), a host system may assume that the memory system has experienced a failure, and may initiate operations to reestablish a connection or reset operations with the memory system. However, in cases where a memory system is actively performing operations that delay a completion of a commanded access operation, such a reset operation may be unnecessary or otherwise undesirable, and may cause undue performance degradation of the system.

In accordance with various examples as disclosed herein, a system may be configured to support access operation status signaling between a host system and a memory system, which may improve the ability of the system to adapt to various access scenarios. For example, when a memory system, or a memory device or component thereof, is performing an error recovery operation (e.g., associated with a received access command), the memory system may indicate that the error recovery operation is being performed or is otherwise ongoing (e.g., pending). Based on such an indication, the host system may determine various responsive operations, such as issuing a command or approval to continue error recovery, issuing a command or request to abort error recovery, or issuing another access command (e.g., a new read, write, or erase command, which may inhibit, supersede, or delay the error recovery operation), among other responsive commands or operations. In another example, a memory system, or a memory device or component thereof, may be configured to perform various media management operations, such as wear leveling, background refresh, garbage collection, scrub, block scans, health monitoring, and others. In some examples, media management operations may delay the completion of an access operation, and a memory system may be configured to indicate that such a delay (e.g., relative to an access command) may be associated with such media management operations. By supporting access operation status signaling in accordance with examples as disclosed herein, a system may avoid unnecessary reset operations, may support improved flexibility for responding to access operation delays, or may support improved prioritization of access operations, among other benefits.

Features of the disclosure are initially described in the context of systems, devices, and circuits as described with reference to FIGS. 1 and 2. Features of the disclosure are further illustrated and described in the context of a system and related operations with reference to FIG. 3. These and other features of the disclosure are further illustrated by and described with reference to apparatus diagrams and flowcharts that relate to access operation status signaling for memory systems as described with reference to FIGS. 4-7.

FIG. 1 is an example of a system 100 that supports access operation status signaling for memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via a physical host interface, which may provide an interface and, in at least some cases, an associated protocol for communicating control, address, data, and other signals between the memory system 110 and the host system 105. Examples of a physical host interface include, but are not limited to, a serial advanced technology attachment (SATA) interface, a UFS interface, an eMMC interface, a peripheral component interconnect express (PCIe) interface, a USB interface, Fiber Channel, Small Computer System Interface (SCSI), Serial Attached SCSI (SAS), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. In some examples, such an interface may be included in or otherwise supported between a host system controller 106 of the host system 105 and a memory system controller 115 of the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface). The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And, in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error checking operations or error correcting code (ECC) operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may, in some cases, instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). The memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete, and update an L2P mapping table to associate the logical address (e.g., LBA) for the data with the new, valid block 170 rather than the old, invalid block 170. In some cases, such copying and remapping may be preferable to erasing and rewriting the entire old block 170, due to latency or wearout considerations, for example. In some cases, one or more copies of an L2P mapping table may be stored within the memory cells of the memory device 130 (e.g., within or more blocks 170 or planes 165) for use (e.g., reference and updating) by the local controller 135 or memory system controller 115.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

The host system 105 may issue commands for the memory system 110 to perform various access operations and, in some examples, a duration for the memory system 110 to perform a commanded access operation (e.g., to send to the host system 105 data or other information associated with completion of the command) may be understood, defined, or otherwise predictable. Such a duration may be exceeded for various reasons, including operational errors of the memory system 110 (e.g., irrecoverable errors, a locked or frozen condition of the memory system 110 or component thereof) or other operations actively being performed at the memory system 110 (e.g., error recovery operations, media management operations, other access operations). In the absence of further information (e.g., in an indeterminate state or non-deterministic state, when an operating status of the memory system 110 is unknown), the host system 105 may assume a condition of the memory system 110 to determine a subsequent command or operation when a duration to perform a commanded access operation is exceeded, which may lead to adverse performance of the system 100.

In some examples, when a threshold duration after transmitting an access command is met or exceeded the host system 105 may, without further information, assume that an inoperable or irrecoverable failure of the memory system 110 has occurred. After such a timeout detection, the host system 105 may attempt to perform a reset operation, such as a soft reset, a hard reset, a physical code reset, or a system command-timeout routine, which may involve reestablishing or rebuilding a physical link with the memory system 110, or otherwise reinitializing the memory system 110, or a component thereof (e.g., reinitializing a memory device 130, reinitializing a memory device 140).

However, in some cases, delays in completing an access operation may be related to the memory system 110 actively performing operations, rather than an inoperable or irrecoverable failure of the memory system 110. For example, completion of an access operation in response to a command may be delayed due to the memory system 110 performing error recovery operations, which may or may not be related to the commanded access operation, or due to the memory system 110 performing media management operations. In some cases, including those related to uncorrectable ECC (UECC) data or operations, a duration for error recovery may be relatively long (e.g., longer than a threshold duration related to access operation completion, which may be 30 seconds or more).

Thus, in some cases, despite a completion of an access operation being delayed, the memory system 110 may be actively performing operations in accordance with expected protocols, and resetting the memory system 110 under such conditions may incur undue performance degradation or latency. In some cases, without permitting a memory system 110 to resolve the conditions or operations that were delaying the completion of an access command, the memory system 110 and the host system 105 may enter a loop condition or deadlock where, in response to delayed completion of commanded access operations, the host system 105 continually triggers reset operations while the memory system 110 is attempting to perform operations such as error recovery or media management operations.

In accordance with various examples as disclosed herein, the system 100 may be configured to support access operation status signaling between the host system 105 and the memory system 110, which may improve the ability of the system 100 to adapt to various access scenarios. For example, when the memory system 110, or a component thereof (e.g., one or both of a memory device 130 or a memory device 140), is performing an error recovery operation, the memory system 110 may indicate (e.g., via a status indication component 125) that the error recovery operation is being performed or is otherwise ongoing. In another example, the memory system 110, or a component thereof, may be configured to perform various media management operations, and the memory system 110 may be configured to indicate (e.g., via a status indication component 125) that the media management operations are underway or ongoing. Although techniques related to access operation status signaling may be performed by a status indication component 125 of a memory system controller 115, such techniques may be variously performed by or distributed across a status indication component of a memory system controller 115, a local controller 135 (e.g., related to operations associated with a memory device 130), a local controller 145 (e.g., related to operations associated with a memory device 140), or a combination thereof.

The host system 105 (e.g., a status indication receiver 107 of a host system controller 106) may be configured to receive such indications, which may include monitoring for a signal or register state, or a change or transition thereof, or polling a register of the memory system 110. Based on such indications, the host system 105 may determine various responsive operations, such as issuing a command or approval to continue the error recovery or media management, issuing a command or request to abort the error recovery or media management, issuing another access command (e.g., a new read, write, or erase command, which may inhibit, supersede, or delay the error recovery or media management), or postpone or inhibit other access commands, among other responsive commands or operations.

By supporting access operation status signaling in accordance with examples as disclosed herein, the system 100 may be able to distinguish between a frozen or inoperable condition of the memory system 110 and an active condition of the memory system 110, which may improve cooperation between a host system 105 and a memory system 110. In some examples, the described techniques may enable to the system 100 to avoid unnecessary reset operations or to improve flexibility for responding to access operation delays. For example, the described techniques may enable the system to reduce latency under nominal conditions and make condition-specific determinations about intervening operations when access operation completion is delayed under other conditions (e.g., when a memory system 110 is performing error recovery or media management operations). In some examples, the described techniques may enable to the system 100 to employ more-powerful ECC techniques that may incur greater latency when they are performed, but improve data recovery or data integrity, which may be situationally enabled or otherwise allowed based on access operation status signaling. In some examples, the described techniques may improve flexibility of the host system 105 for deciding how to deal with UECC data, which might involve a longer duration than an access operation need more time to recover than an access operation threshold. In some examples, the described techniques may enable the system 100 to improve prioritization of access operations, including inhibiting or suppressing error recovery or media management when related delays may adversely affect high-priority access commands, which may enable the host system 105 to provide a better user experience by moving data error recovery or media management off the gating of a command queue. Thus, related to these and other benefits, the system 100 may advantageously employ access operation status signaling for improved performance relative to a configuration where the host system 105 assumes an operating condition of the memory system 110 without such signaling.

Figure 2:
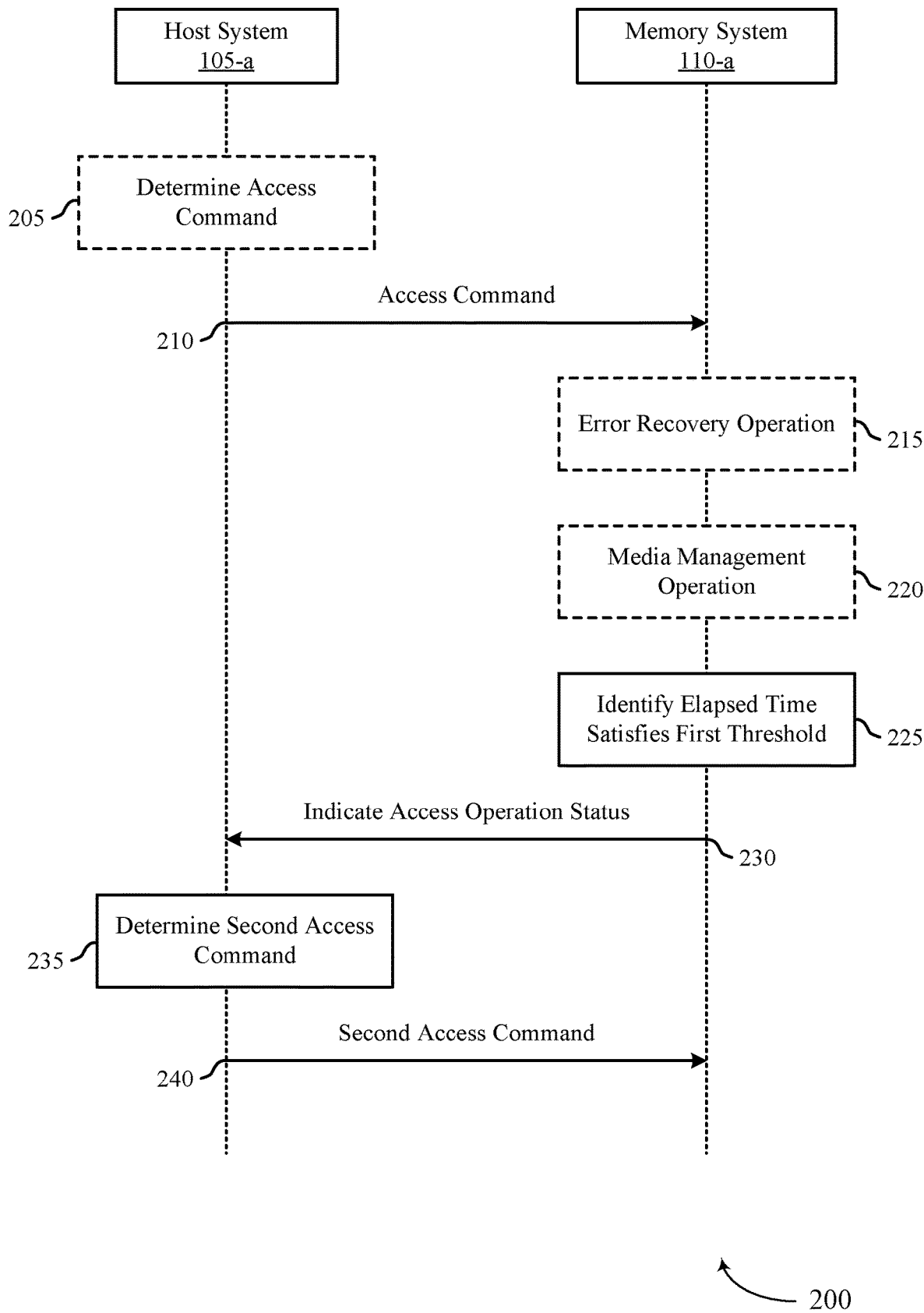
FIG. 2 illustrates an example of a system that supports access operation status signaling for memory systems in accordance with examples as disclosed herein.

FIG. 2 illustrates an example of a system 200 that supports access operation status signaling for memory systems in accordance with examples as disclosed herein. The system 200 includes a host system 105-a and a memory system 110-a, which may be examples of the respective components described with reference to FIG. 1, and illustrates various examples of respective operations and signaling between the components. In some examples, the memory system 110-a (e.g., a memory device 130 of the memory system 110-a) may include a memory array having a plurality of multi-level NAND memory cells. However, the techniques described herein may be applied to other memory architectures, and other configurations of host systems 105 and memory systems 110.

In some examples, at 205, the host system 105-a may determine an access command (e.g., for accessing memory of the memory system 110-a, for accessing a memory device 130 or a memory device 140 of the memory system 110-a, for accessing a memory array of the memory system 110-a). For example, the host system 105-a may determine a read command to read data from the memory system 110-a, or the host system 105-a may determine a write command to store data at the memory system 110-a.

At 210, the host system 105-a may transmit an access command (e.g., a read command, a write command, an erase command) to the memory system 110-a, which may be received by the memory system 110-a (e.g., at a memory system controller 115, at a local controller 135, at a local controller 145). In some examples, the command of 210 may be a command to perform an access operation (e.g., a read operation, a write operation, an erase operation) on a memory array of the memory system 110-a. The memory system 110-a may initiate or perform an access operation in response to receiving the command of 210. The memory system 110-a may process the access command, which may include various aspects of receiving, demodulating, decoding, or otherwise interpreting the access command.

In some examples, at 215, the memory system 110-a (e.g., a memory system controller 115, a local controller 135, a local controller 145) may initiate or perform an error recovery operation, which may be initiated based at least in part on the command of 210 (e.g., based on an error when performing the access operation, a read error, a write error). In various examples, the error recovery operations may include such techniques as a read retry, a write retry, a low-density parity check (LDPC) hard read, a LDPC soft read, redundant array of independent nodes (RAIN) or redundant array of independent disks (RAID) rebuilding, and others. In some examples, an error recovery operation of 215 may delay a completion of an access operation associated with the command of 210 (e.g., a transfer of read data, a confirmation of data writing).

In some examples, at 220, the memory system 110-a (e.g., a memory system controller 115, a local controller 135, a local controller 145) may initiate or perform a media management operation, which may or may not be related to the access command of 210. For example, at 220, the memory system 110-a may perform one or more of a wear leveling operation, a background refresh operation, a garbage collection operation, a scrub operation, a block scan operation, a health monitoring operation, or another media management operation. In some examples, a media management operation of 220 may delay a completion of an access operation associated with the command of 210 (e.g., a transfer of read data, a confirmation of data writing).

Although the operations of the system 200 illustrate both the error recovery operations of 215 and the media management operation of 220, in various examples, the system 200 may perform only one of the error recovery operation of 215 or the media management operation of 220, or the system 200 may perform both the error recovery operation of 215 and the media management operation of 220, which may be performed concurrently or during otherwise overlapping time intervals. Moreover, although the media management operation of 220 is illustrated as occurring after the error recovery operation of 215, in some examples, a media management operation as described with reference to the operations of 220 may occur or be initiated before the error recovery operation of 215, which may include a media management operation being initiated or performed before the host system 105-a transmits the access command at 210.

At 225, the memory system 110-a (e.g., a memory system controller 115, a local controller 135, a local controller 145, a status indication component 125) may identify that an elapsed time after the host system 105-a transmitted the access command of 210, or an elapsed time after the memory system 110-a receives the access command of 210, satisfies (e.g., equals or exceeds) a first threshold. In some examples, the memory system 110-a may make or perform such an identification before completing the access operation associated with the command of 210.

In various examples, the first threshold may be configured at the memory system 110-*a* as part of a manufacturing or trimming operation, or the first threshold may be a static, semi-static, or dynamic parameter configured by the host system 105-*a*. For example, to configure the first threshold, the memory system 110-*a* may receive an indication of a recovery time limit from the host system 105-*a*, which may be associated with (e.g., written to) a RECOVERY TIME LIMIT field of a mode register or other storage location at the memory system 110-*a* for configuration information (e.g., of a UFS Read-Write Error Recovery Mode Page). In some examples, such a threshold may be associated with a duration within which a memory system 110-*a* may be free to perform various operations, but upon or after which the memory system 110-*a* may be expected to transmit a response to the host system 105-*a*. Without such a response, the host system 105-*a* may assume that the memory system 110-*a* is stuck, frozen, or otherwise inoperable, and the host system 105-*a* may accordingly proceed with reset operations (e.g., a hard reset, rebuilding a communications link).

At 230, the memory system 110-*a* (e.g., a memory system controller 115, a local controller 135, a local controller 145, a status indication component 125) may indicate a status of the access operation associated with the command of 210, which may be based on the identification of 225 that the elapsed time satisfies the first threshold. The indication of 230 may be received or processed at the host system 105-*a* (e.g., at a status indication receiver 107), which may include various aspects of receiving, demodulating, decoding, or otherwise interpreting the access command. In some examples, to indicate the status of the access operation, the memory system 110-*a* may indicate that an error recovery operation (e.g., of 215, associated with the access command of 210) is being performed or is ongoing. In some examples, to indicate the status of the access operation, the memory system 110-*a* may indicate that an access operation, or completion thereof, is delayed due to a media management operation (e.g., of 220).

In various examples, the indication of 230 may be an active transmission by the memory system 110-*a*, or the indication of 230 may involve a setting of a register or other storage location (e.g., a field thereof) at the memory system 110-*a* that may be polled by host system 105. For example, the indication of 230 may include setting a field defined in a UFS Sense Key or like structure. For example, a new field for a register or other storage location may be defined (e.g., a RECOVERY ABORTED field for a UFS Sense Key, though this is merely an example field name within an example location and is not limiting), or a new command, message, or field within a command or message may be defined.

At 235, the host system 105-*a* may determine (e.g., based on receiving the access operation status indicated at 230) a second access command to transmit to the memory system 110-*a*. The determination at 235 may consider various access scenarios, including access operation prioritization, latency, and others. At 240 (e.g., based on the determination of 235), the host system 105-*a* may transmit a second access command to the memory system 110-*a*, which the memory system 110-*a* may receive (e.g., at a memory system controller 115, at a local controller 135, at a local controller 145) to initiate or perform one or more responsive operations. The memory system 110-*a* may process the access command, which may include various aspects of receiving, demodulating, decoding, or otherwise interpreting the access command.

In some examples, at 235, the host system 105-*a* may determine a second command for the memory system 110-*a* to abort the access operation commanded at 210. For example, the host system 105-*a* may determine that the data is no longer needed, or may be accessed from another location (e.g., from a different memory device of the memory system 110-*a*, from a different LBA of the memory system 110-*a*). Accordingly, at 240, whether the memory system 110-*a* had been continuing to perform error recovery or had paused error recovery, the memory system 110-*a* may receive the command to abort the access operation, and may responsively abort the access operation, or abort an error recovery operation associated with the access operation, which may include inhibiting a data transfer to the host system 105-*a*. In some examples, the host system 105-*a* may be configured to explicitly give up the data associated with access command of 210, and the host device may unmap, discard, or rewrite an associated LBA.

In some examples, the memory system 110-*a* may be configured to continue error recovery operations, or other operations, beyond a threshold duration since an access command upon receiving permission or approval signaling from the host system 105-*a*. In other words, the memory system 110-*a* may require permission to continue error recovery operations after a configured duration has passed after the access command of 210. In some examples, the access operation of 210 may be associated with data that is critical to the host system 105-*a* and, at 235, the host system 105-*a* may determine a second command for the memory system 110-*a* to continue an error recovery operation (e.g., of 215). In some examples, such a command may be communicated as a command to continue data recovery by re-reading the same LBA again (e.g., a second command that may be a duplicate of the command of 210). Accordingly, at 240, the memory system 110-*a* may receive the command to continue the error recovery operation, and continue the error recovery operation based at least in part on receiving the second command. In some examples, the memory system 110-*a* may continue performing the error recovery operation of 215 after indicating the access operation status at 230, even in the absence of such indicated permission.

In some examples, in response to the access operation status indicated at 230, the host system 105-*a* may determine to process another access command (e.g., an access command in a queue of access commands, a second access command corresponding to a different LBA), which may inhibit the access operation, or related error recovery operations, associated with the access command of 210. Accordingly, at 240, the memory system 110-*a* may receive the second access command and initiate a different access operation, which may include inhibiting the access operation associated with the command of 210, or a related error recovery operation of 215. In some examples, the memory system 110-*a* may attempt to re-read the information of the access command of 210, or retry various error recovery operations, when the system 200 transitions to an IDLE state, which may provide the memory system 110-*a* with a longer recovery time to correct the data associated with the command of 210.

In some examples, the described techniques may be extended to multiple time limits or thresholds, or other types of thresholds (e.g., relative to the communication of an access command at 210). For example, the memory system 110-*a* may continue a commanded access operation, or error recovery or media management operations, after indicating access operation status of 230. However, upon reaching or exceeding a second threshold (e.g., relative to receiving the access command at 210, relative to indicating the access operation status at 230), the memory system 110-*a* may initiate or perform other operations.

In some examples, the memory system 110-*a* may determine to abort an error recovery operation related to the access command of 210 after a certain time has passed. For example, the memory system 110-*a* may identify, before completing the access operation, that an elapsed time after receiving the command at 210 satisfies a second threshold (e.g., meets or exceeds the second threshold), and abort an error recovery operation based at least in part on the identifying. In some examples, the memory system 110-*a* may indicate, to the host system 105-*a*, that the error recovery operation has been aborted (e.g., as a second indication of an access operation status), and the host system 105-*a* may determine an operation or another access command based on such an indication.

In some examples, the memory system 110-*a* may identify, before completing the access operation, that a quantity of retries associated with an error recovery operation satisfies a threshold (e.g., meets or exceeds the threshold), and abort the error recovery operation based on such an identification. In some examples, a threshold quantity of retries may be configured at the memory system 110-*a* as part of a manufacturing or trimming operation, or a threshold quantity of retries may be a static, semi-static, or dynamic parameter configured by the host system 105-*a*. For example, to configure a threshold quantity of retries, the memory system 110-*a* may receive or identify an indication of a READ RETRY COUNT or WRITE RETRY COUNT field of a mode register (e.g., of a UFS Read-Write Error Recovery Mode Page) as configured by the host system 105-*a*.

In some examples, operations and signaling described with reference to the system 200 associated with the memory system 110-*a* may be performed by or otherwise supported by a memory system controller 115 as described with reference to FIG. 1 (e.g., a status indication component 125). Although illustrated in the context of a host system 105-*a* and a memory system 110-*a*, in some examples, the described techniques may illustrate operations or signaling associated with a memory device 130 or a memory device 140 (e.g., a local controller 135, a local controller 145), which may or may not be supported by or communicated via a memory system controller 115. In some examples, certain operations or signaling illustrated by the memory system 110-*a* may be performed at a system level (e.g., by a memory system controller 115) and certain operations or signaling may be performed at a device level (e.g., by a local controller 135, by a local controller 145). In various examples, a memory system controller 115, or a local controller 135, or a local controller 145, or a combination thereof, may be referred to as a control component coupled with a memory array of the memory system 110-*a* and configured to cause the memory system 110-*a* to perform various operations described herein. Moreover, in various examples, the host system 105-*a*, or a component thereof, may be referred to as a control component configured to be coupled with the memory system 110-*a* and configured to cause the host system 105-*a* to perform various operations described herein.

Figure 3:
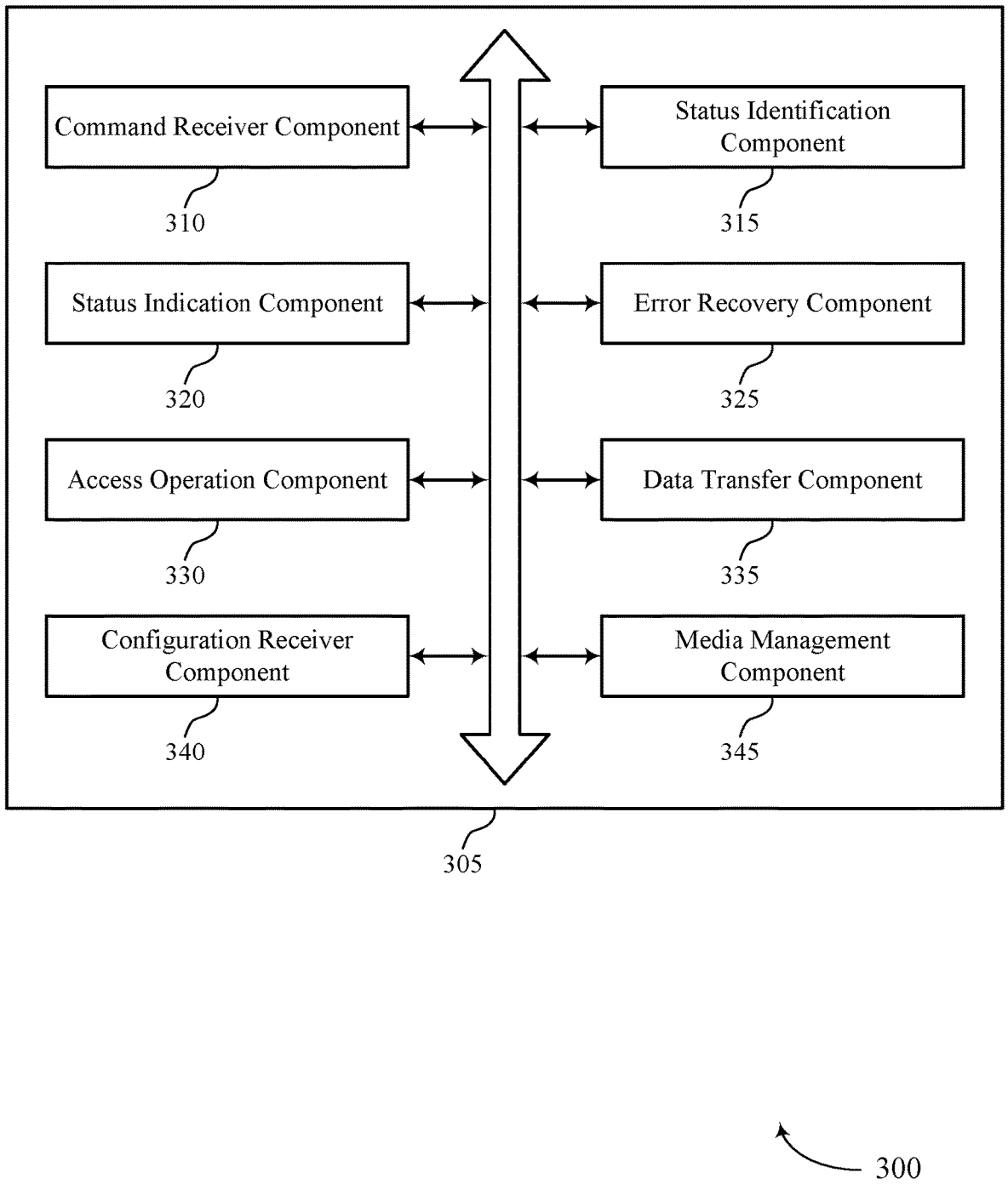
FIG. 3 shows a block diagram of a memory system that supports access operation status signaling for memory systems in accordance with examples as disclosed herein.

FIG. 3 shows a block diagram 300 of a memory system 305 that supports access operation status signaling for memory systems in accordance with examples as disclosed herein. The memory system 305 may be an example of aspects of a memory system as described with reference to FIGS. 1 and 2. The memory system 305 may include a command receiver component 310, a status identification component 315, a status indication component 320, an error recovery component 325, an access operation component 330, a data transfer component 335, a configuration receiver component 340, and a media management component 345. Each of these modules may communicate, directly or indirectly, with one another (e.g., via one or more buses).

The command receiver component 310 may receive or otherwise process a received commands from a host system to perform an access operation at the memory system 305 (e.g., on a memory array of the memory system 305).

In some examples, the command receiver component 310 may receive or process, from the host system and based on indicating that an error recovery operation is ongoing, a second command from the host system to abort the access operation.

In some examples, the command receiver component 310 may receive or process, from the host system and based on indicating that an error recovery operation is ongoing, a third command from the host system to continue the error recovery operation.

In some examples, the command receiver component 310 may receive or process a fourth command from the host system to perform a second access operation at the memory system 305 (e.g., on a memory array of the memory system 305).

The status identification component 315 may identify, before completing the access operation, that an elapsed time after receiving the command satisfies a threshold.

In some examples, the status identification component 315 may identify, before completing the access operation, that the elapsed time after receiving the command satisfies a second threshold.

In some examples, the status identification component 315 may identify, before completing the access operation, that a quantity of retries associated with an error recovery operation satisfies a third threshold.

The status indication component 320 may indicate, to the host system and based on identifying that the elapsed time satisfies the threshold, a status of the access operation.

In some examples, the status indication component 320 may indicate, to the host system, that the memory system 305 has aborted the error recovery operation.

The error recovery component 325 may initiate an error recovery operation based on a command (e.g., received from the host system). In some examples, to indicate a status of an access operation, the status indication component 320 may indicate that the error recovery operation is ongoing.

In some examples, the error recovery component 325 may continue the error recovery operation based on receiving or processing the third command.

In some examples, the error recovery component 325 may inhibit the error recovery operation while performing the second access operation based on receiving or processing the fourth command.

In some examples, the error recovery component 325 may abort the error recovery operation based on identifying that the elapsed time after receiving the command satisfies the second threshold.

In some examples, the error recovery component 325 may abort the error recovery operation based on identifying that the quantity of retries associated with the error recovery operation satisfies the third threshold.

The access operation component 330 may abort the error recovery operation, or the access operation, or both the error recovery operation and the access operation based on receiving or processing the second command.

The data transfer component 335 may inhibit a data transfer to the host system based on the error recovery component 325 aborting an error recovery operation, or the access operation component 330 aborting the access operation, or inhibit both the error recovery operation and the access operation.

The configuration receiver component 340 may receive or otherwise process an indication of a read retry count from the host system, and the error recovery component 325 may identify that the quantity of retries associated with the error recovery operation satisfies the third threshold based on the read retry count.

In some examples, the configuration receiver component 340 may receive or otherwise process an indication of a recovery time limit from the host system, and the status identification component 315 may identify that the elapsed time satisfies the threshold based on the recovery time limit.

The media management component 345 may initiate a media management operation and, to indicate the status of the access operation, the status indication component 320 may indicate that the access operation is delayed due to the media management operation.

Figure 4:
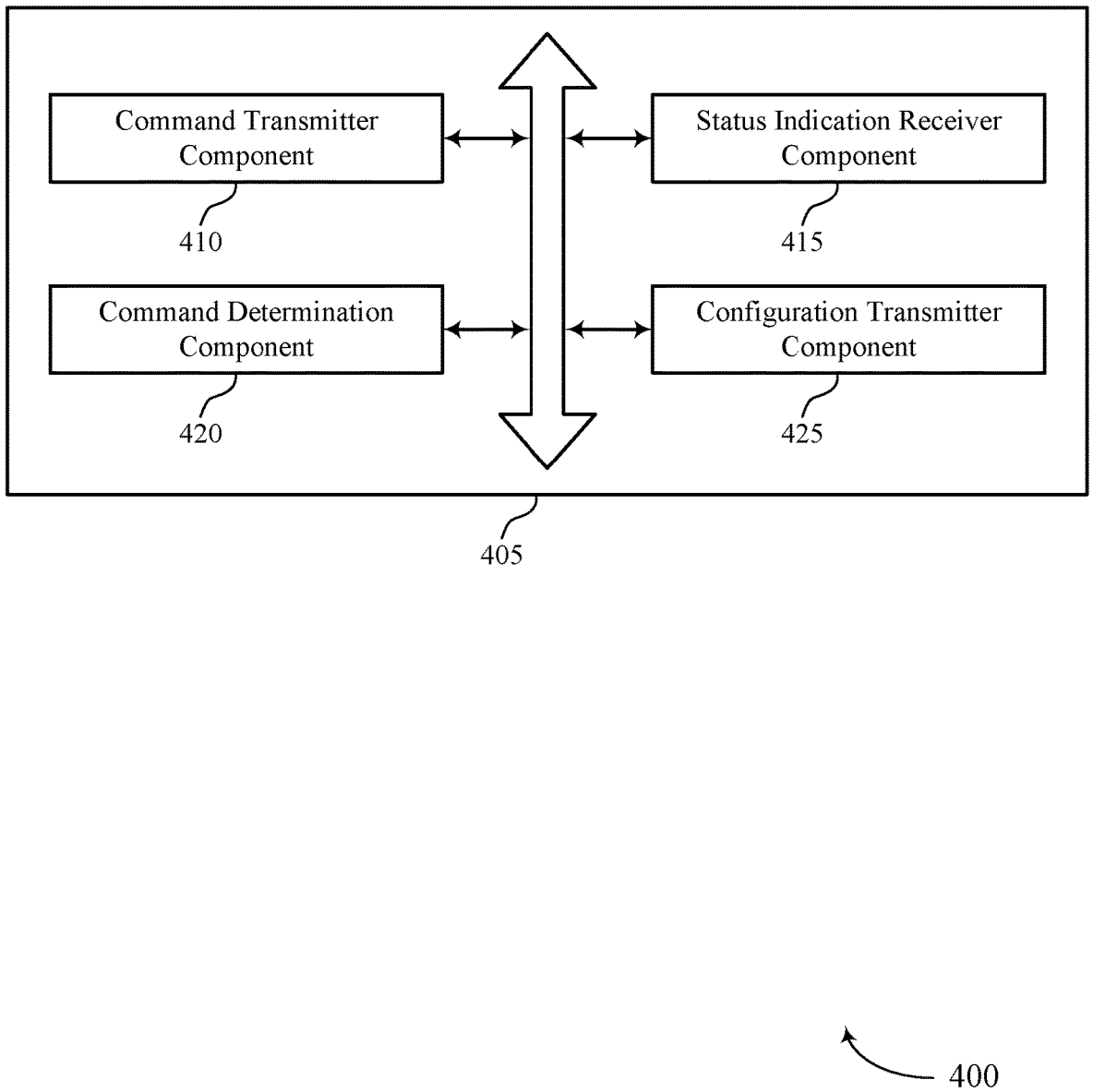
FIG. 4 shows a block diagram of a host system that supports access operation status signaling for memory systems in accordance with examples as disclosed herein.

FIG. 4 shows a block diagram 400 of a host system 405 that supports access operation status signaling for memory systems in accordance with examples as disclosed herein. The host system 405 may be an example of aspects of a host system as described with reference to FIGS. 1 and 2. The host system 405 may include a command transmitter component 410, a status indication receiver component 415, a command determination component 420, and a configuration transmitter component 425. Each of these modules may communicate, directly or indirectly, with one another (e.g., via one or more buses).

The command transmitter component 410 may transmit a command to a memory system to perform an access operation at the memory system (e.g., on a memory array of the memory system).

In some examples, the command transmitter component 410 may transmit a second command to the memory system.

The status indication receiver component 415 may receive or otherwise process, from the memory system and based on an elapsed time after transmitting the command satisfying a threshold, an indication of a status of the access operation.

In some examples, to receive or process the indication of the status of the access operation, the status indication receiver component 415 may receive or process an indication that the memory system is performing an error recovery operation associated with the command.

In some examples, the status indication receiver component 415 may receive or process, from the memory system, an indication that the memory system has aborted the error recovery operation.

In some examples, the status indication receiver component 415 may receive or process, from the memory system, an indication that the access operation is delayed due to a media management operation.

The command determination component 420 may determine, based on receiving or processing the indication of the status of the access operation, a second command.

In some examples, the command determination component 420 may determine the second command based on receiving or processing an indication that the memory system is performing an error recovery operation associated with the command.

In some examples, the command determination component 420 may determine the second command based on receiving an indication that the memory system has aborted an error recovery operation.

In some cases, the second command is for the memory system to abort the access operation.

In some cases, the second command is for the memory system to continue the error recovery operation.

In some cases, the second command is for the memory system to perform a second access operation at the memory system.

The configuration transmitter component 425 may transmit, to the memory system, an indication of a recovery time limit from the host system, where the elapsed time after transmitting the command satisfying the threshold is based on the recovery time limit.

Figure 5:
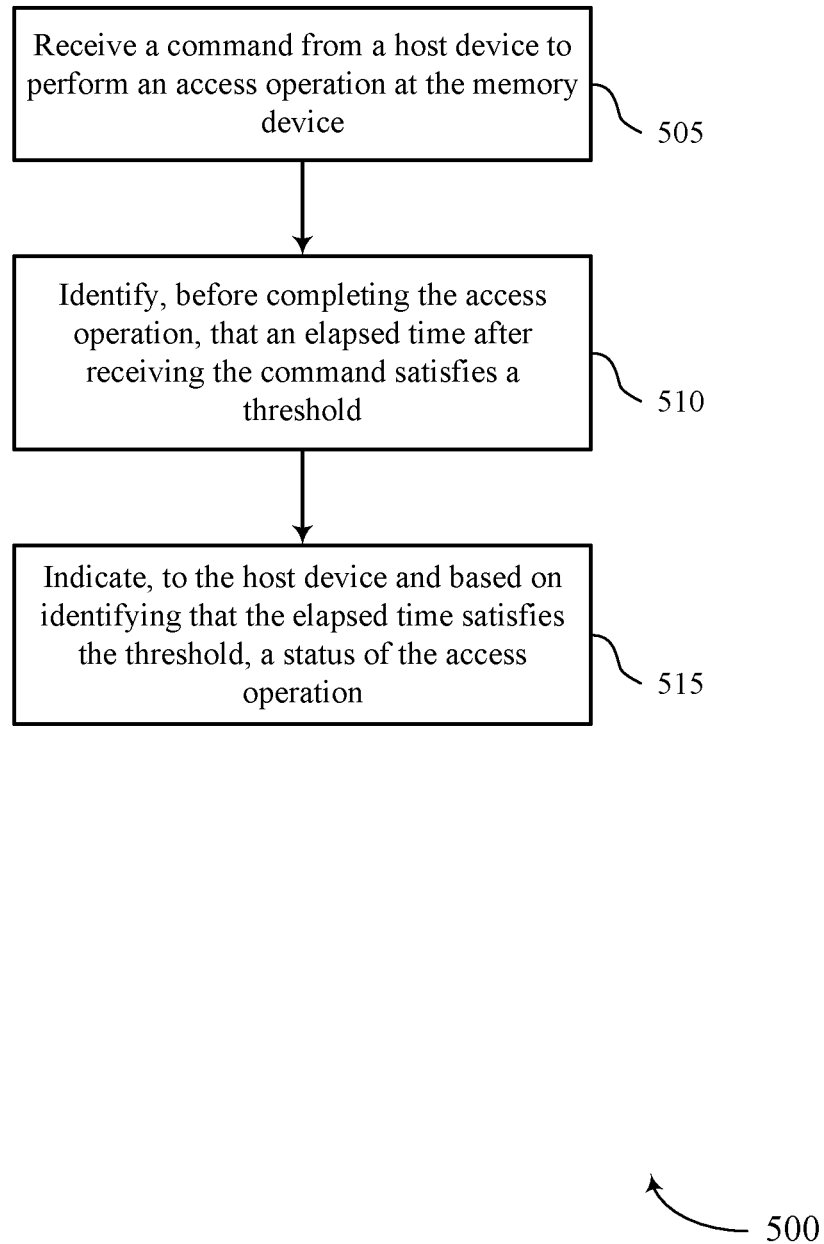
FIGS. 5 and 6 show flowcharts illustrating a method or methods that support access operation status signaling for memory systems in accordance with examples as disclosed herein.

FIG. 5 shows a flowchart illustrating a method or methods 500 that supports access operation status signaling for memory systems in accordance with aspects of the present disclosure. The operations of method 500 may be implemented by a memory system or its components (e.g., a memory system controller, a memory device, a local controller) as described herein. For example, the operations of method 500 may be performed by a memory system as described with reference to FIG. 3, which, in some examples, may include a memory array having a plurality of multi-level NAND memory cells. In some examples, a memory system may execute a set of instructions to control the functional elements of the memory system to perform the described functions. Additionally or alternatively, a memory system may perform aspects of the described functions using special-purpose hardware.

At 505, the method may include receiving a command (e.g., an access command, a read command, a write command, an erase command) from a host system to perform an access operation at the memory system (e.g., on a memory array of the memory system). The operations of 505 may be performed according to the methods described herein. In some examples, aspects of the operations of 505 may be performed by a command receiver component as described with reference to FIG. 3.

At 510, the method may include identifying, before completing the access operation, that an elapsed time after receiving the command satisfies a threshold. The operations of 510 may be performed according to the methods described herein. In some examples, aspects of the operations of 510 may be performed by a status identification component as described with reference to FIG. 3.

At 515, the method may include indicating, to the host system and based on identifying that the elapsed time satisfies the threshold, a status of the access operation. The operations of 515 may be performed according to the methods described herein. In some examples, aspects of the operations of 515 may be performed by a status indication component as described with reference to FIG. 3.

In some examples, an apparatus as described herein may perform a method or methods, such as the method 500. The apparatus may include features, circuitry, means, or instructions (e.g., a non-transitory computer-readable medium storing instructions executable by a processor) for receiving or processing, at a memory system, a command from a host system to perform an access operation at the memory system (e.g., on a memory array of the memory system), identifying, at the memory system and before completing the access operation, that an elapsed time after receiving the command satisfies a threshold, and indicating, to the host system and based on identifying that the elapsed time satisfies the threshold, a status of the access operation.

Some examples of the method 500 and the apparatus described herein may further include operations, features, circuitry, means, or instructions for initiating an error recovery operation based on the command, and indicating the status of the access operation may include indicating that the error recovery operation is ongoing.

Some examples of the method 500 and the apparatus described herein may further include operations, features, circuitry, means, or instructions for receiving, from the host system and based on indicating that the error recovery operation may be ongoing, a second command from the host system to abort the access operation, and aborting the error recovery operation, or the access operation, or both the error recovery operation and the access operation based on receiving the second command.

Some examples of the method 500 and the apparatus described herein may further include operations, features, circuitry, means, or instructions for inhibiting a data transfer to the host system based on aborting the error recovery operation, or the access operation, or both the error recovery operation and the access operation.

Some examples of the method 500 and the apparatus described herein may further include operations, features, circuitry, means, or instructions for receiving, from the host system and based on indicating that the error recovery operation is ongoing, a third command from the host system to continue the error recovery operation, and continuing the error recovery operation based on receiving the third command.

Some examples of the method 500 and the apparatus described herein may further include operations, features, circuitry, means, or instructions for receiving, at the memory system, a fourth command from the host system to perform a second access operation at the memory system, and inhibiting the error recovery operation while performing the second access operation based on receiving the fourth command.

Some examples of the method 500 and the apparatus described herein may further include operations, features, circuitry, means, or instructions for identifying, at the memory system and before completing the access operation, that the elapsed time after receiving the command satisfies a second threshold, and aborting the error recovery operation based on identifying that the elapsed time after receiving the command satisfies the second threshold.

Some examples of the method 500 and the apparatus described herein may further include operations, features, circuitry, means, or instructions for indicating, to the host system, that the memory system has aborted the error recovery operation.

Some examples of the method 500 and the apparatus described herein may further include operations, features, circuitry, means, or instructions for identifying, at the memory system and before completing the access operation, that a quantity of retries associated with the error recovery operation satisfies a third threshold, and aborting the error recovery operation based on identifying that the quantity of retries associated with the error recovery operation satisfies the third threshold.

Some examples of the method 500 and the apparatus described herein may further include operations, features, circuitry, means, or instructions for receiving an indication of a read retry count from the host system, and identifying that the quantity of retries associated with the error recovery operation satisfies the third threshold may be based on the read retry count.

Some examples of the method 500 and the apparatus described herein may further include operations, features, circuitry, means, or instructions for receiving an indication of a recovery time limit from the host system, and identifying that the elapsed time satisfies the threshold may be based on the recovery time limit.

Some examples of the method 500 and the apparatus described herein may further include operations, features, circuitry, means, or instructions for initiating a media management operation, and indicating the status of the access operation may include indicating that the access operation is delayed due to the media management operation.

Figure 6:
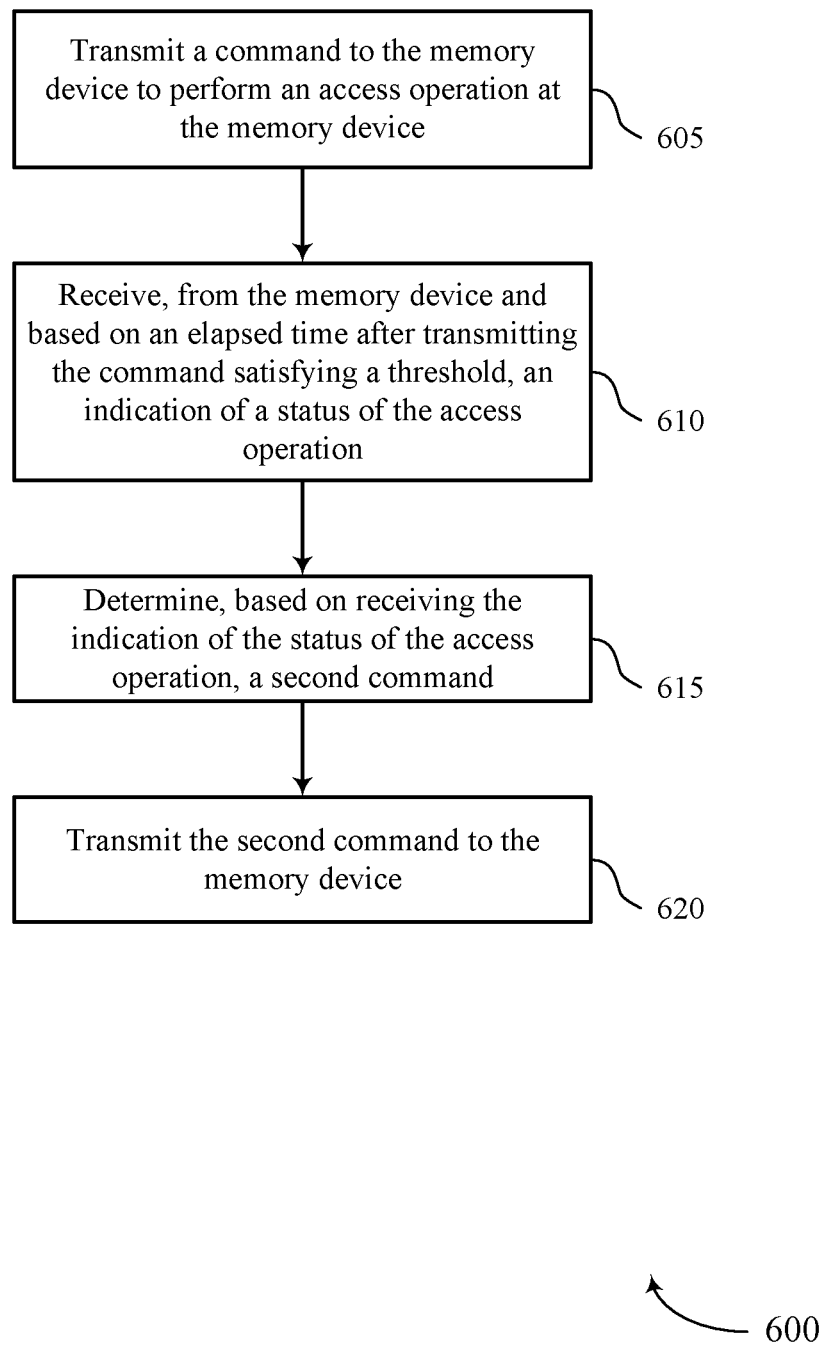

FIG. 6 shows a flowchart illustrating a method or methods 600 that supports access operation status signaling for memory systems in accordance with aspects of the present disclosure. The operations of method 600 may be implemented by a host system or its components (e.g., a host system controller) as described herein. For example, the operations of method 600 may be performed by a host system as described with reference to FIG. 4. In some examples, a host system may execute a set of instructions to control the functional elements of the host system to perform the described functions. Additionally or alternatively, a host system may perform aspects of the described functions using special-purpose hardware.

At 605, the method may include transmitting a command (e.g., an access command, a read command, a write command, an erase command) to the memory system to perform an access operation at the memory system. The operations of 605 may be performed according to the methods described herein. In some examples, aspects of the operations of 605 may be performed by a command transmitter component as described with reference to FIG. 4.

At 610, the method may include receiving, from the memory system and based on an elapsed time after transmitting the command satisfying a threshold, an indication of a status of the access operation. The operations of 610 may be performed according to the methods described herein. In some examples, aspects of the operations of 610 may be performed by a status indication receiver component as described with reference to FIG. 4.

At 615, the method may include determining, based on receiving the indication of the status of the access operation, a second command. The operations of 615 may be performed according to the methods described herein. In some examples, aspects of the operations of 615 may be performed by a command determination component as described with reference to FIG. 4.

At 620, the host system may transmit the second command to the memory system. The operations of 620 may be performed according to the methods described herein. In some examples, aspects of the operations of 620 may be performed by a command transmitter component as described with reference to FIG. 4.

In some examples, an apparatus as described herein may perform a method or methods, such as the method 600. The apparatus may include features, circuitry, means, or instructions (e.g., a non-transitory computer-readable medium storing instructions executable by a processor) for transmitting, from a host system, a command to a memory system to perform an access operation at the memory system, receiving or processing, from the memory system and based on an elapsed time after transmitting the command satisfying a threshold, an indication of a status of the access operation, determining, based on receiving the indication of the status of the access operation, a second command, and transmitting the second command to the memory system.

In some examples of the method 600 and the apparatus described herein, receiving the indication of the status of the access operation may include operations, features, circuitry, means, or instructions for receiving an indication that the memory system is performing an error recovery operation associated with the command, and determining the second command may be based on receiving the indication that the memory system is performing the error recovery operation associated with the command.

In some examples of the method 600 and the apparatus described herein, the second command may be for the memory system to abort the access operation.

In some examples of the method 600 and the apparatus described herein, the second command may be for the memory system to continue the error recovery operation.

In some examples of the method 600 and the apparatus described herein, the second command may be for the memory system to perform a second access operation at the memory system.

Some examples of the method 600 and the apparatus described herein may further include operations, features, circuitry, means, or instructions for receiving, from the memory system, an indication that the memory system has aborted the error recovery operation, where determining the second command includes determining the second command based on receiving the indication that the memory system has aborted the error recovery operation.

Some examples of the method 600 and the apparatus described herein may further include operations, features, circuitry, means, or instructions for transmitting, to the memory system, an indication of a recovery time limit from the host system, and the elapsed time after transmitting the command satisfying the threshold may be based on the recovery time limit.

In some examples of the method 600 and the apparatus described herein, receiving the indication of the status of the access operation may include operations, features, circuitry, means, or instructions for receiving, from the memory system, an indication that the access operation is delayed due to a media management operation.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory array and a control component coupled with the memory array. In some examples, the memory array may include a set of multi-level NAND memory cells. The control component may be configured to cause the apparatus to receive or process a command from a host system to perform an access operation on the memory array, identify, before completing the access operation, that an elapsed time after receiving the command satisfies a threshold, and indicate, to the host system and based on identifying that the elapsed time satisfies the threshold, a status of the access operation.

In some examples of the apparatus, the control component may be configured to cause the apparatus to initiate an error recovery operation based on the command, and, to indicate the status of the access operation, the control component may be configured to cause the apparatus to indicate that the error recovery operation is ongoing.

In some examples of the apparatus, the control component may be configured to cause the apparatus to receive or process, from the host system and based on indicating that the error recovery operation is ongoing, a second command from the host system to abort the access operation, and abort the error recovery operation, or the access operation, or both the error recovery operation and the access operation based on receiving or processing the second command.

In some examples of the apparatus, the control component may be configured to cause the apparatus to inhibit a data transfer to the host system based on aborting the error recovery operation, or the access operation, or both the error recovery operation and the access operation.

In some examples of the apparatus, the control component may be configured to cause the apparatus to receive or process, from the host system and based on indicating that the error recovery operation is ongoing, a third command from the host system to continue the error recovery operation, and continue the error recovery operation based on receiving or processing the third command.

In some examples of the apparatus, the control component may be configured to cause the apparatus to receive or process a fourth command from the host system to perform a second access operation on the memory array, and inhibit the error recovery operation while performing the second access operation based on receiving or processing the fourth command.

In some examples of the apparatus, the control component may be configured to cause the apparatus to identify, before completing the access operation, that the elapsed time after receiving the command satisfies a second threshold, and abort the error recovery operation based on identifying that the elapsed time after receiving the command satisfies the second threshold.

In some examples of the apparatus, the control component may be configured to cause the apparatus to indicate, to the host system, that the control component has aborted the error recovery operation.

In some examples of the apparatus, the control component may be configured to cause the apparatus to identify, before completing the access operation, that a quantity of retries associated with the error recovery operation satisfies a third threshold, and abort the error recovery operation based on identifying that the quantity of retries associated with the error recovery operation satisfies the third threshold.

In some examples of the apparatus, the control component may be configured to cause the apparatus to receive or process an indication of a read retry count from the host system, and the control component may be configured to cause the apparatus to identify that the quantity of retries associated with the error recovery operation satisfies the third threshold based on the read retry count.

In some examples of the apparatus, the control component may be configured to cause the apparatus to receive or process an indication of a recovery time limit from the host system, and, to indicate the status of the access operation, the control component may be configured to cause the apparatus to identify that the elapsed time satisfies the threshold based on the recovery time limit.

In some examples of the apparatus, the control component may be configured to cause the apparatus to initiate a media management operation, and, to indicate the status of the access operation, the control component may be configured to cause the apparatus to indicate that the access operation is delayed due to the media management operation.

An apparatus is described. The apparatus may include a control component configured to be coupled with a memory system. The control component may be configured to cause the apparatus to transmit, to the memory system, a command to perform an access operation at the memory system, receive or process, from the memory system and based on an elapsed time after transmitting the command satisfying a threshold, an indication of a status of the access operation, determine, based on receiving the indication of the status of the access operation, a second command, and transmit the second command to the memory system.

In some examples of the apparatus, to receive the indication of the status of the access operation, the control component may be configured to receive or process an indication that the memory system is performing an error recovery operation associated with the command, and, to determine the second command, the control component may be configured to cause the apparatus to determine the second command based on receiving the indication that the memory system is performing the error recovery operation associated with the command.

In some examples, the second command may be for the memory system to abort the access operation.

In some examples, the second command may be for the memory system to continue the error recovery operation.

In some examples, the second command may be for the memory system to perform a second access operation at the memory system.

In some examples of the apparatus, the control component may be configured to cause the apparatus to receive or process, from the memory system, an indication that the memory system has aborted the error recovery operation, and, to determine the second command, the control component may be configured to cause the apparatus to determine the second command based on receiving or processing the indication that the memory system has aborted the error recovery operation.

In some examples of the apparatus, the control component may be configured to cause the apparatus to transmit, to the memory system, an indication of a recovery time limit, where the elapsed time after transmitting the command satisfying the threshold may be based on the recovery time limit.

In some examples of the apparatus, the control component may be configured to cause the apparatus to receive, from the memory system, an indication that the access operation is delayed due to a media management operation.

A non-transitory computer-readable medium is described. The non-transitory computer readable medium may store code comprising instructions which, when executed by a processor of an electronic device, cause the electronic device to receive or process a command from a host system to perform an access operation at a memory system, identify, before completing the access operation, that an elapsed time after receiving the command satisfies a threshold, and indicate, to the host system and based at least in part on identifying that the elapsed time satisfies the threshold, a status of the access operation.

In some examples of the non-transitory computer-readable medium, the instructions, when executed by the processor of the electronic device, further cause the electronic device to initiate an error recovery operation at the memory system based at least in part on the command, and indicate the status of the access operation based at least in part on indicating that the error recovery operation is ongoing.

Another non-transitory computer-readable medium is described. The non-transitory computer readable medium may store code comprising instructions which, when executed by a processor of an electronic device, cause the electronic device to transmit, to a memory system, a command to perform an access operation at the memory system, receive or process, based at least in part on an elapsed time after transmitting the command satisfying a threshold, an indication from the memory system of a status of the access operation, determine, based at least in part on receiving or processing the indication of the status of the access operation, a second command, and transmit the second command to the memory system.

In some examples of the non-transitory computer-readable medium, the instructions to receive or process the indication of the status of the access operation, when executed by the processor of the electronic device, cause the electronic device to receive or process an indication that the memory system is performing an error recovery operation associated with the command, and the instructions to determine the second command, when executed by the processor of the electronic device, cause the electronic device to determine the second command based at least in part on the indication that the memory system is performing the error recovery operation associated with the command.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a memory array; and
   a controller coupled with the memory array and configured to cause the apparatus to:
   receive, from a host system, a command to perform an access operation on the memory array;
   initiate a media management operation that is different than a write operation and is different than a read operation;
   transmit, to the host system and based at least in part on an elapsed time after receiving the command satisfying a threshold, an indication that the access operation is delayed due to the media management operation; and
   receive, from the host system based at least in part on the indication, a second command to perform one or more operations associated with the memory array or the media management operation.

2. The apparatus of claim 1, wherein the second command is to abort the access operation, and wherein, to perform the one or more operations, the controller is configured to cause the apparatus to:
   abort the access operation based at least in part on receiving the second command.

3. The apparatus of claim 1, wherein the second command is to continue the media management operation, and wherein, to perform the one or more operations, the controller is configured to cause the apparatus to:
   continue the media management operation based at least in part on receiving the second command.

4. The apparatus of claim 1, wherein the second command is to perform a second access operation, and wherein, to perform the one or more operations, the controller is further configured to cause the apparatus to:
   inhibit the media management operation while performing the second access operation based at least in part on receiving the second command.

5. The apparatus of claim 1, wherein the second command is to abort the media management operation, and wherein, to perform the one or more operations, the controller is configured to cause the apparatus to:
   abort the media management operation based at least in part on receiving the second command.

6. The apparatus of claim 1, wherein the controller is further configured to cause the apparatus to:
   identify, before completing the access operation, that an elapsed time after transmitting the indication satisfies a second threshold; and
   abort the media management operation based at least in part on identifying that the elapsed time after transmitting the indication satisfies the second threshold.

7. The apparatus of claim 1, wherein the controller is further configured to cause the apparatus to:
   store an indication of a status of the access operation in a register, wherein the indication of the status is configured to indicate that the access operation is delayed due to the media management operation, and wherein the controller is configured to cause the apparatus to transmit the indication based at least in part on the register being polled by the host system.

8. The apparatus of claim 1, wherein the controller is further configured to cause the apparatus to:
   receive, from the host system, a second indication of the threshold, wherein the controller is configured to cause the apparatus to transmit the indication based at least in part on receiving the second indication of the threshold.

9. The apparatus of claim 1, wherein the threshold is configured during a manufacturing of the apparatus.

10. The apparatus of claim 1, wherein the controller is further configured to cause the apparatus to transmit the indication before the access operation is completed.

11. An apparatus, comprising:
    a controller configured to be coupled with a memory system, wherein the controller is configured to cause the apparatus to:
    transmit, to the memory system, a command to perform an access operation at the memory system;
    receive, from the memory system and based at least in part on an elapsed time after transmitting the command satisfying a threshold, an indication that the access operation is delayed due to a media management operation that is different than a write operation and is different than a read operation; and
    transmit, to the memory system, a second command to perform one or more operations associated with a memory array of the memory system or the media management operation based at least in part on the indication.

12. The apparatus of claim 11, wherein the second command is for the memory system to abort the access operation.

13. The apparatus of claim 11, wherein the second command is for the memory system to continue the media management operation.

14. The apparatus of claim 11, wherein the second command is for the memory system to perform a second access operation at the memory system.

15. The apparatus of claim 11, wherein the second command is for the memory system to abort the media management operation.

16. The apparatus of claim 11, wherein the controller is further configured to cause the apparatus to:
    refrain, based at least in part on receiving the indication, from performing a reset operation associated with the elapsed time after transmitting the command satisfying the threshold.

17. The apparatus of claim 11, wherein the controller is further configured to cause the apparatus to:
    poll a register of the memory system that is configured to store a status of the access operation, wherein the controller is configured to cause the apparatus to receive the indication based at least in part on polling the register.

18. The apparatus of claim 11, wherein the controller is further configured to cause the apparatus to:

receive, from the memory system, a second indication that the memory system has aborted the media management operation, wherein the controller is configured to cause the apparatus to determine the second command based at least in part on the second indication that the memory system has aborted the media management operation.

19. The apparatus of claim 11, wherein the controller is further configured to cause the apparatus to:

transmit, to the memory system, a second indication of the threshold, wherein the indication is received based at least in part on transmitting the second indication of the threshold.

20. A non-transitory computer-readable medium storing code comprising instructions which, when executed by a processor of an electronic device, cause the electronic device to:

receive, from a host system, a command to perform an access operation at a memory system;

initiate a media management operation at the memory system that is different than a write operation and is different than a read operation;

transmit, to the host system and based at least in part on an elapsed time after receiving the command satisfying a threshold, an indication that the access operation is delayed due to the media management operation; and receive, from the host system based at least in part on the indication, a second command to perform one or more operations associated with a memory array of the memory system or the media management operation.

* * * * *